(12) United States Patent
Maddipatla

(10) Patent No.: US 8,839,207 B2
(45) Date of Patent: *Sep. 16, 2014

(54) DEBUGGING EXTENSIBLE MARKUP LANGUAGE

(71) Applicant: International Business Machines Corporation, Armonk, NY (US)

(72) Inventor: Anil K. Maddipatla, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,551

(22) Filed: Jun. 18, 2013

(65) Prior Publication Data

US 2013/0283244 A1 Oct. 24, 2013

Related U.S. Application Data

(63) Continuation of application No. 12/639,065, filed on Dec. 16, 2009, now Pat. No. 8,490,063.

(51) Int. Cl.
*G06F 9/44* (2006.01)
*G06F 9/45* (2006.01)
*G06F 11/36* (2006.01)

(52) U.S. Cl.
CPC ........ *G06F 11/3636* (2013.01); *G06F 11/3624* (2013.01)
USPC ............ 717/129; 717/108; 717/124; 717/136

(58) Field of Classification Search
None
See application file for complete search history.

(56) References Cited

U.S. PATENT DOCUMENTS

| | | | |
|---|---|---|---|
| 6,463,578 B1 | 10/2002 | Johnson | |
| 6,836,857 B2 | 12/2004 | Ten-Hove et al. | |
| 7,478,366 B2 | 1/2009 | Bickson et al. | |
| 7,694,282 B2 * | 4/2010 | Arkhipov et al. | 717/129 |
| 8,423,969 B2 * | 4/2013 | Arnold et al. | 717/129 |
| 2004/0015840 A1 * | 1/2004 | Walker | 717/108 |
| 2005/0273768 A1 * | 12/2005 | Doughan | 717/136 |
| 2006/0041865 A1 * | 2/2006 | Narayana et al. | 717/124 |
| 2006/0064677 A1 | 3/2006 | Bickson et al. | |
| 2006/0129993 A1 * | 6/2006 | Belisario et al. | 717/124 |
| 2006/0259898 A1 * | 11/2006 | Reinhardt | 717/124 |
| 2007/0079299 A1 | 4/2007 | Daly | |
| 2007/0168996 A1 * | 7/2007 | Klein | 717/129 |
| 2008/0141118 A1 * | 6/2008 | Arkhipov et al. | 715/241 |
| 2008/0163179 A1 * | 7/2008 | Arnold et al. | 717/129 |
| 2008/0301648 A1 * | 12/2008 | Heidasch | 717/129 |
| 2009/0300578 A1 * | 12/2009 | Neil | 717/104 |
| 2010/0192121 A1 | 7/2010 | Unnithan et al. | |

OTHER PUBLICATIONS

Exchanger XML Editor—XSLT Debugger, Cladonia Ltd, 2005, 18 pages, [retrieved on Feb. 28, 2013], Retrieved from the Internet: <URL:http://www.exchangerxml.com/editor/pdf/XSLTDebuggerA4.pdf>.*

(Continued)

*Primary Examiner* — Tuan Q. Dam
*Assistant Examiner* — Geoffrey St Leger
(74) *Attorney, Agent, or Firm* — Jordan IP Law, LLC

(57) ABSTRACT

Disclosed is a method and system for debugging XML files or documents by inserting a breakpoint into an XML file and converting the XML file into a bytecode format, where the breakpoint is propagated into the bytecode format and stored in runtime libraries. During runtime, on encountering the breakpoint, the location of the breakpoint is internally determined in the bytecode and points to the location of the breakpoint in the XML file.

18 Claims, 4 Drawing Sheets

(56) References Cited

OTHER PUBLICATIONS

Generating Java Code from an XML schema with an XSL stylesheet, IBM TDB, Jun. 26, 2001, 3 pages, [retrieved on Jun. 5, 2012], Retrieved from the Internet: <URL:http://ip.com>.*

Beres, J., "Sams Teach Yourself Visual Studio. NET 2003 in 21 Days," Sams, Jan. 14, 2003, 3 pages, retrieved Jun. 13, 2012, <http://academic.safaribooksonline.com>.

"Exchanger XML Editor—XSLT Debugger," Cladonia Ltd, 2005, 18 pages, retrieved Feb. 28, 2013, <http://www.exchangerxtml.com/editor/pdf/XSLTDebuggerA4.pdf>.

Generating Java Code from an XML schema with an XSL stylesheet,: IBM TBD, Jun. 26, 2001, 3 pages, retrieved Jun. 5, 2012, <http://ip.com>.

* cited by examiner

DEBUGGING EXTENSIBLE MARKUP LANGUAGE

CROSS-REFERENCE TO RELATED APPLICATIONS

The present application is a continuation of U.S. patent application Ser. No. 12/639,065 filed on Dec. 16, 2009.

BACKGROUND OF THE INVENTION

Typically enterprise applications or the applications that rely and work on dynamic data mostly use eXtensible Markup Language (XML) for storing and retrieving such data, as XML is a widely accepted form for data storage and retrieval. While building applications there is a need to debug the application or programs, which interact with the XML files specifically to read the data. Therefore, while debugging such programs there is always a missing link of how to debug the XML files that are encounter on the way of proceeding with the program flow. Currently, the development environment tools that provide the debugging facility don't provide an option to set the debug points in the XML files through which the program flow might take us. A missing link at this place would cause the debugging work to go mostly with assumptions which might lead to misleading results at times.

Conventional solutions to this typically incorporate the debug statements in code, i.e., the software code, that print out the values obtained after parsing the XML document. This method is quite strenuous and any changes or addition to debug statements that is included will demand re-compiling and re-running the new binaries obtained. In case of relatively large software applications this becomes increasingly tedious, gruesome and time consuming.

SUMMARY OF THE INVENTION

Embodiments of the invention provide a solution for debugging XML documents, as a part of application debugging, to fill the grey area of debugging applications dependent on XML for dynamic data.

Embodiments of the invention relate to a method and a system for debugging eXtensible markup language (XML) documents by receiving an XML file as input; converting the XML file received into an Object code (bytecode) format. The breakpoint information is captured and stored in the bytecode. The bytecode generated is in a format which can be retrieved at a later stage, for example during runtime, to locate the exact location of the breakpoint in the XML file. Execution of the bytecode includes encountering the breakpoint, and on encountering the breakpoint within the bytecode, the breakpoint in the bytecode includes information on the exact pointer in the XML file to debug the XML file.

Additional features and advantages are realized through the embodiments of the invention. Other embodiments and aspects of the invention are described in detail herein and are considered to be part of the claimed invention. For a better understanding of embodiments the invention with advantages and features, reference is made to the description and to the drawings.

BRIEF DESCRIPTION OF THE DRAWINGS

These and further aspects of embodiments the invention will become apparent with reference made to the accompanying drawings. The drawings illustrate embodiments of the invention, and together with the description, serve to further explain the embodiments disclosed. In the drawings

DETAILED DESCRIPTION OF THE INVENTION

Figure 1:
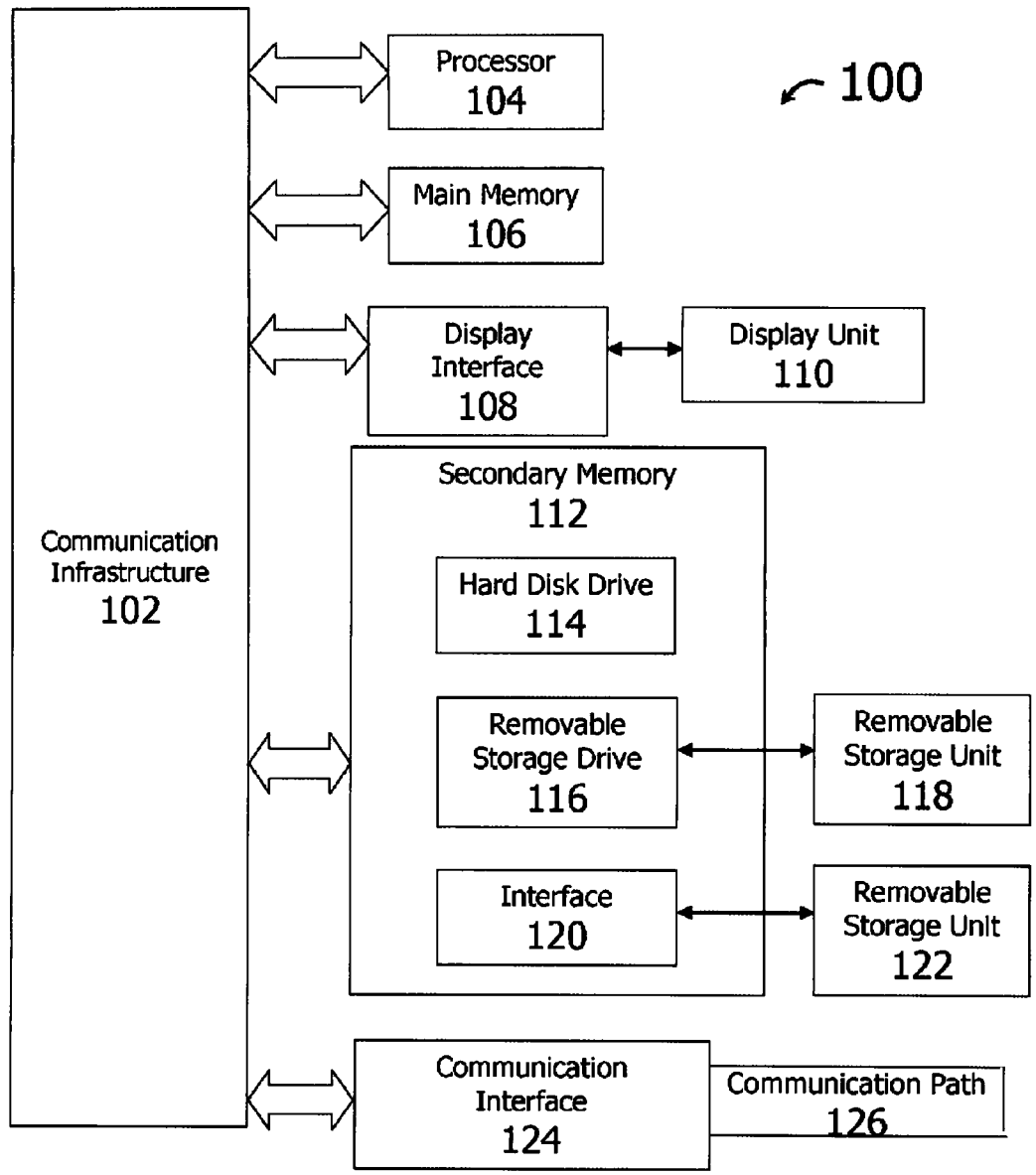
FIG. 1 is a data processing system of an embodiment of the invention.

FIG. 1 is a block diagram of a data processing system 100, for example a computing system such as a desktop computer, laptop computer, PDA, mobile phone and the like, that can be used for implementing embodiments of the present invention. Data processing system 100 includes one or more processors, for example processor 104 as illustrated in FIG. 1. Processor 104 is coupled to a communication infrastructure 102 (for example, a communications bus, cross-over bar, or network). Various software embodiments are described in terms of this data processing system. After reading this description, it will become apparent to a person of ordinary skill in the relevant art(s) how to implement the invention using other data processing systems and/or computer architectures.

The data processing system 100 can include display interface 108 that forwards graphics, text, and other data from the communication infrastructure 102 (or from a frame buffer not shown) for display on display unit 110. Data processing system 100 also includes main memory 106, which can be random access memory (RAM), and may also include secondary memory 112. Secondary memory 112 may include, for example, hard disk drive 114 and/or removable storage drive 116, representing a floppy disk drive, a magnetic tape drive, an optical disk drive, etc. Removable storage drive 116 reads from and/or writes to removable storage unit 118 in a manner well known to those having ordinary skill in the art. Removable storage unit 118 represents, for example, a floppy disk, magnetic tape, optical disk, etc. which is read by and written to by removable storage drive 116. As will be appreciated, removable storage unit 118 includes a computer usable storage medium having stored therein computer software and/or data.

In embodiments, secondary memory 112 may include other similar memory for allowing computer programs or other instructions to be loaded into the computer system. Such memory may include, for example, removable storage unit 122 and interface 120. Examples of such memory may include a program storage and storage interface (such as that found in video game devices), a removable memory chip (such as an EPROM, or PROM) and associated socket, and other removable storage units 122 and interfaces 120 which allow software and data to be transferred from removable storage unit 122 to data processing system 100.

Data processing system 100 may also include a communications interface 124. Communications interface 124 allows software and data to be transferred between the data processing system and any other external devices. Examples of communications interface 124 may include a modem, a network interface (such as an Ethernet card), a communications port, a PCMCIA slot and card, etc. Software and data transferred via communications interface 124 are typically in the form of signals which may be, for example, electronic, electromagnetic, optical, or other signals capable of being received by communications interface 124. These signals are provided to communications interface 124 via communications path (that is, channel) 126. Channel 126 carries signals and may be implemented using wire or cable, fiber optics, a phone line, a cellular phone link, an RF link, and/or other communications channels.

The terms "computer program medium," "computer usable medium," and "computer readable medium" are used to generally refer to tangible media such as main memory 106 and secondary memory 112, removable storage drive 116, a hard disk installed in hard disk drive 114, and signals thereof. Computer program products are tangible media for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, which allows a computer to read such computer readable information.

Computer programs (also called computer control logic) are typically stored in main memory 106 and/or secondary memory 112. Computer programs may also be received via communications interface 124. Such computer programs, when implemented, can enable the computer system to perform the features of embodiments of the invention as discussed herein. In particular, computer programs, when implemented, enable processor 104 to perform the features of data processing system 100. Accordingly, such computer programs represent controllers of the data processing system.

Figure 2:
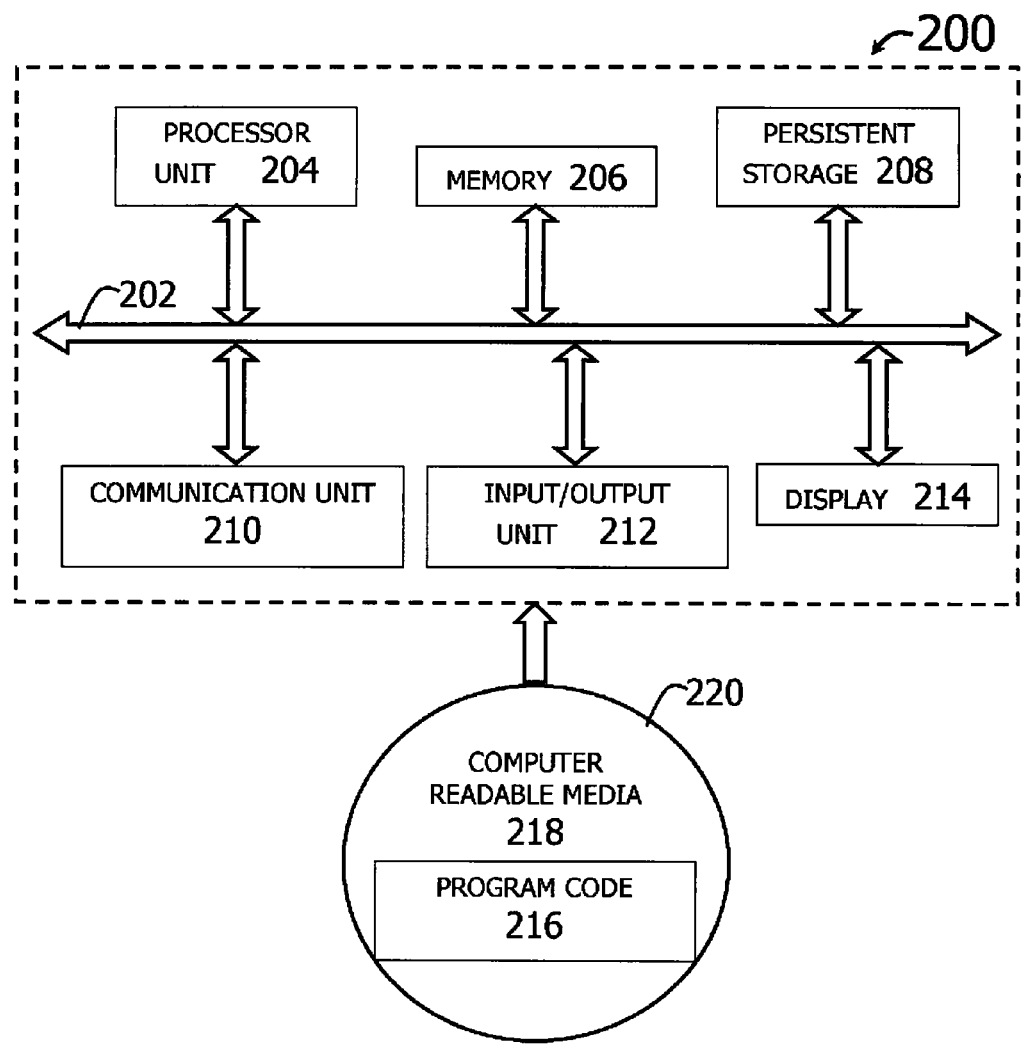
FIG. 2 illustrates an embodiment of data processing indicating a storage to store and execute embodiments of the invention.

FIG. 2 illustrates an embodiment of a block diagram of data processing system 100 of FIG. 1 in which illustrative embodiments of the invention may be implemented. Data processing system 200 is an example of a computer in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214 which have been disclosed with respect to FIG. 1.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices and may include a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user. In one embodiment, input unit 212 is a keyboard. Instructions for the operating system and applications or programs are located on persistent storage 208. These instructions may be loaded into memory 206 for implementation by processor unit 204. The processes of the different embodiments may be performed by processor unit 204 using computer implemented instructions, which may be located in a memory, such as memory 206. These instructions are referred to as program code, computer usable program code, or computer readable program code that may be read and implemented by a processor in processor unit 204. Program code in the form of different embodiments may be represented on different physical or tangible computer readable media, such as memory 206 or persistent storage 208.

Program code 216 is located in a functional form on computer readable media 218 that is selectively removable and may be loaded onto or transferred to data processing system 200 for implementation by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can vary from the illustrative examples shown.

As one example, a storage device in data processing system 200 is any hardware apparatus that may store data. Memory 206, persistent storage 208, and computer readable media 218 are examples of storage devices in a tangible form. In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
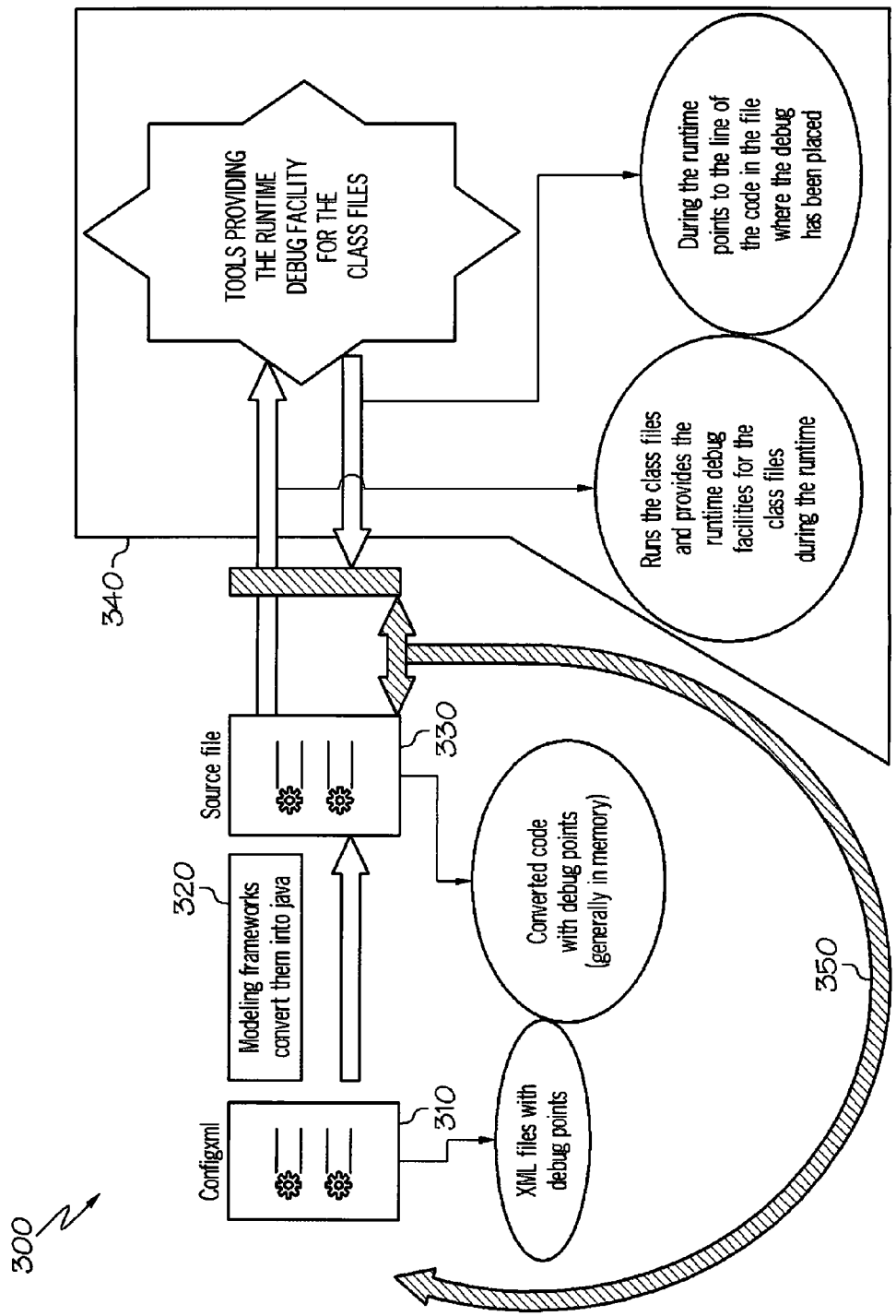
FIG. 3 illustrates an embodiment of architecture/framework 300 to debug XML files in accordance with the embodiments of the invention that can be operated on a data processing system described in FIGS. 1 and 2.

FIG. 3 illustrates an embodiment of architecture/framework 300 to debug XML files in accordance with the embodiments of the invention that can be operated on a data processing system described in FIGS. 1 and 2. XML file 310 is taken as input and is configured by adding debug point 315 in the XML file. XML file 310 having the debug instruction is then converted into java files 330 using modeling framework 320. For example, the Eclipse Modeling Framework (EMF) can be used to convert the XML files into bytecode files. EMF can convert the XML files to java object files and these java object files are then available for usage by any application. During conversion the modeling tools provide application programming interfaces (APIs) to access and modify the XML file.

Conventionally these java files can be debugged as illustrated in 340 by tools that provide runtime debug facility for the class files. The EMF runs the class files and provides the runtime debug facility for the class files during the runtime. Once this is completed, during runtime the EMF points to the line of the code in the source file where the debug instruction has been placed. With embodiments of the invention, the complete illustration of 340 is no longer required, thereby saving processor time, cost and several other factors on the data processing system. Currently the method of conversion to a form of bytecode and accessing and modifying XML files does not provide any approach to debug the XML file itself In accordance with the embodiment of the invention the solid arrow 350 illustrates the improvement where XML files can be effectively debugged. The aim here is to intercept the call from the development tools that attempt to trace back a debug call and check if the code is a pure java code or whether the code thus obtained is java code that is obtained by parsing the XML file. If this is a call to a pure java code the development tool proceeds as usual. If the call is for the XML file, then internally determine the location of the debug point, typically by reversing the technique of the XML conversion to java in the XML file and then point to the XML file.

Figure 4:
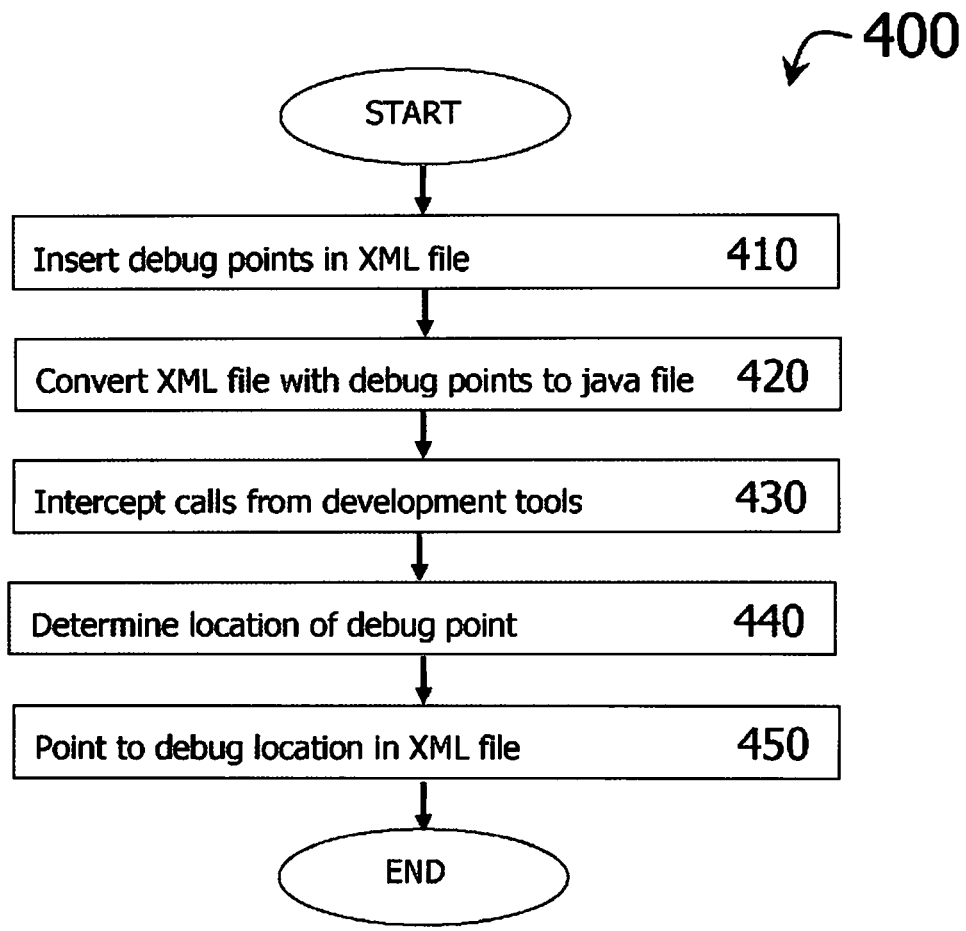
FIG. 4 illustrates an embodiment of the method steps 400 in accordance with the embodiments of the invention that can be operated on a data processing system described in FIGS. 1 and 2.

FIG. 4 illustrates an embodiment of the method steps 400 in accordance with the embodiments of the invention that can be operated on a data processing system described in FIGS. 1 and 2. In step 410 debug points are inserted into an XML file. The particular locations for inserting the debug points are chosen by the developer or user. Once the debug points are inserted into the XML file, in step 420 the XML file is converted to a java file using a modeling tool framework such as the Eclipse Modeling Framework. In step 430 the development tool is configured to intercept the calls and then trace back the debug call. A check is made as to whether the java code is pure java code or is obtained from parsing the XML file into java code. If the code is determined to be pure java code the development tool is allowed to proceed with debugging as usual. If the code is determined to be from a XML file that was parsed, then in step 440 the location of the debug point is determined internally by reversing the technique of XML conversion to java in the XML file, and in step 450 point to the debug location in the XML file.

Basically the disclosure tries to provide a mechanism or a process through which we can debug XML while debugging the application. For this, the sequence followed is as follows. First, a user places debug points in the XML file. Next while converting the XML file to a bytecode format (of any language), capture the debug points and propagate them into the bytecode and store them in the libraries used for runtime. Next, the stored information about a debug point indicates the corresponding mapping in the XML file and other information. Finally, during runtime when this debug point is encountered, retrieve the stored information regarding this particular debug point in the bytecode and directly pointing to the XML file.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

When a single element or article is described herein, it will be apparent that more than one element/article (whether or not they cooperate) may be used in place of a single element/article. Similarly, where more than one element or article is described herein (whether or not they cooperate), it will be apparent that a single element/article may be used in place of the more than one element or article. The functionality and/or the features of an element may be alternatively represented by one or more other elements which are not explicitly described as having such functionality/features. Thus, other embodiments need not include the element itself.

Although embodiments of the invention have been described with reference to the embodiments described above, it will be evident that other embodiments may be alternatively used to achieve the same object. The scope is not limited to the embodiments described above, but can also be applied to software and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. Embodiments of the invention can be implemented by hardware comprising several distinct elements.

I claim:
1. A method comprising:
   inserting one or more breakpoints into an eXtensible markup language (XML) document to form one or more inserted breakpoints;
   converting the XML document into a byte code format;
   intercepting one or more calls associated with a debug operation for the byte code format; and
   determining a location of one or more of the inserted breakpoints in the XML document in response to one or more of the calls associated with the debug operation for the byte code format if it is confirmed that the byte code format is obtained from the converting of the XML document into the byte code format.

2. The method of claim 1, wherein an Eclipse Modeling Framework (EMF) is used to convert the XML document into the byte code format.

3. The method of claim 1, wherein the byte code format includes a Java object file.

4. The method of claim 1, wherein determining the location of the inserted breakpoints includes:
converting the byte code format back into the XML document; and
pointing to one or more of the inserted breakpoints in the XML document.

5. The method of claim 1, wherein confirming that the byte code format is obtained from the converting includes determining if the XML document is parsed to form the byte code format.

6. The method of claim 1, wherein the debug operation proceeds for the byte code format without determining the location of the inserted breakpoints in the XML document if it is confirmed that the byte code format is not obtained from the converting of the XML document into the byte code format.

7. A computer program product comprising:
a computer readable storage memory; and
computer usable code stored on the computer readable storage memory, where, if executed by a processor, the computer usable code causes a computer to:
insert one or more breakpoints into an eXtensible markup language (XML) document to form one or more inserted breakpoints;
convert the XML document into a byte code format;
intercept one or more calls associated with a debug operation for the byte code format; and
determine a location of one or more of the inserted breakpoints in the XML document in response to one or more of the calls associated with the debug operation for the byte code format if it is confirmed that the byte code format is obtained from the conversion of the XML document into the byte code format.

8. The computer program product of claim 7, wherein the computer usable code, if executed, further causes a computer to employ an Eclipse Modeling Framework (EMF) to convert the XML document into the byte code format.

9. The computer program product of claim 7, wherein the computer usable code, if executed, further causes a computer to cause the byte code format to include a Java object file.

10. The computer program product of claim 7, wherein the computer usable code, if executed, further causes a computer to convert the byte code format back into the XML document and point to one or more of the inserted breakpoints in the XML document.

11. The computer program product of claim 7, wherein the computer usable code, if executed, further causes a computer to confirm that the byte code format is obtained from the conversion including determining if the XML document is parsed to form the byte code format.

12. The computer program product of claim 7, wherein the computer usable code, if executed, further causes a computer to implement the debug operation for the byte code format without determining the location of the inserted breakpoints in the XML document if it is confirmed that the byte code format is not obtained from the conversion of the XML document into the byte code format.

13. A system comprising:
a memory; and
at least one processor, coupled to said memory, and operative to:
insert one or more breakpoints into an eXtensible markup language (XML) document to form one or more inserted breakpoints;
convert the XML document into a byte code format;
intercept one or more calls associated with a debug operation for the byte code format; and
determine a location of one or more of the inserted breakpoints in the XML document in response to one or more of the calls associated with the debug operation for the byte code format if it is confirmed that the byte code format is obtained from the conversion of the XML document into the byte code format.

14. The system of claim 13, wherein an Eclipse Modeling Framework (EMF) is to be used to convert the XML document into the byte code format.

15. The system of claim 13, wherein the byte code format is to include a Java object file.

16. The system of claim 13, wherein determining the location of the inserted breakpoint is to include converting the byte code format back into the XML document and pointing to one or more of the inserted breakpoints in the XML document.

17. The system of claim 13, wherein confirming that the byte code format is obtained from the conversion includes determining if the XML document is parsed to form the byte code format.

18. The system of claim 13, wherein the debug operation is to proceed for the byte code format without determining the location of the inserted breakpoints in the XML document if it is confirmed that the byte code format is not obtained from the conversion of the XML document into the byte code format.

* * * * *